United States Patent
Chung et al.

(10) Patent No.: US 9,031,052 B2
(45) Date of Patent: *May 12, 2015

(54) UPLINK TRANSMISSION CONTROL METHOD IN SYSTEM SUPPORTING AN UPLINK MULTIPLE ACCESS TRANSMISSION MODE

(75) Inventors: Jae Hoon Chung, Anyang-si (KR); Min Seok Noh, Anyang-si (KR); Yeong Hyeon Kwon, Anyang-si (KR); Hyun Soo Ko, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 568 days.

This patent is subject to a terminal disclaimer.

(21) Appl. No.: 13/001,741

(22) PCT Filed: Jul. 14, 2009

(86) PCT No.: PCT/KR2009/003863
§ 371 (c)(1),
(2), (4) Date: Dec. 28, 2010

(87) PCT Pub. No.: WO2010/008180
PCT Pub. Date: Jan. 21, 2010

(65) Prior Publication Data
US 2011/0110357 A1 May 12, 2011

Related U.S. Application Data

(60) Provisional application No. 61/080,679, filed on Jul. 14, 2008, provisional application No. 61/089,891, filed on Aug. 18, 2008, provisional application No. 61/157,911, filed on Mar. 6, 2009, provisional application No. 61/157,913, filed on Mar. 6, 2009.

(51) Int. Cl.
*H04B 7/208* (2006.01)
*H04L 5/00* (2006.01)
*H04W 72/04* (2009.01)

(52) U.S. Cl.
CPC ......... *H04L 5/0048* (2013.01); *H04W 72/0413* (2013.01); *H04L 5/0023* (2013.01); *H04L 5/0041* (2013.01)

(58) Field of Classification Search
CPC ....................................................... H04L 5/0023
USPC ................................................. 370/344, 482
See application file for complete search history.

(56) References Cited

U.S. PATENT DOCUMENTS

| | | | |
|---|---|---|---|
| 2007/0042784 A1 | 2/2007 | Anderson | |
| 2008/0043650 A1* | 2/2008 | Jang et al. | 370/310 |
| 2008/0318608 A1* | 12/2008 | Inoue et al. | 455/509 |
| 2009/0238121 A1* | 9/2009 | Kotecha | 370/329 |

FOREIGN PATENT DOCUMENTS

WO  WO 2007-130011 A1  11/2007

OTHER PUBLICATIONS

"Proportional Fair Scheduling of Uplink Single-Carrier FDMA Systems" by Lim et al., IEEE PIMRC'06, 2006.*
"A Multiple Access Scheme for the Uplink of Broadband Wireless Systems" by Dinis et al., IEEE Globecom 2004.*

* cited by examiner

*Primary Examiner* — Ayaz Sheikh
*Assistant Examiner* — Hai-Chang Hsiung
(74) *Attorney, Agent, or Firm* — McKenna Long & Aldridge LLP

(57) ABSTRACT

Disclosed herein is a method of generating an uplink reference signal in a system supporting a plurality of uplink access schemes. The method includes, at a base station, transmitting reference signal configuration information indicating the configuration of a reference signal to be transmitted in uplink, which is generated according to the plurality of uplink access schemes, to a user equipment which is set to operate in an uplink access scheme corresponding to the information, and receiving a subframe including the reference signal generated based on the reference signal configuration information from the user equipment. The reference signal configuration information includes a cyclic shift value of a sequence of the reference signal.

6 Claims, 16 Drawing Sheets

(a)

(b)

UPLINK TRANSMISSION CONTROL METHOD IN SYSTEM SUPPORTING AN UPLINK MULTIPLE ACCESS TRANSMISSION MODE

This application claims the benefit of U.S. Provisional Patent Application Nos. 61/080,679, filed on Jul. 14, 2008, 61/089,891, filed on Aug. 18, 2008, 61/157,911, filed on Mar. 6, 2009, and 61/157,913, filed on Mar. 6, 2009 and PCT Application No. PCT/KR2009/003863, filed on Jul. 14, 2009, which is hereby incorporated by reference as if fully set forth herein.

BACKGROUND OF THE INVENTION

1. Field of the Invention

The present invention relates to a mobile communication technology, and more particularly, to an uplink transmission control method in a system supporting an uplink multiple access scheme. The present invention relates to an uplink control information transmission method, an uplink reference signal generation method and an uplink multiple access scheme indication method.

2. Discussion of the Related Art

In a mobile communication system, a user equipment (UE) may receive information from a base station (BS) in downlink and transmit information in uplink. The information transmitted or received by the UE includes data and a variety of control information, and a physical channel varies according to the type of information transmitted or received by the UE.

FIG. 1 is a view showing physical channels used for a 3$^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a BS in step S101. In order to perform the initial cell search, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Meanwhile, if the UE does not complete the access to the BS, the UE may perform a random access procedure in steps S103 to S106, in order to complete access to the BS. In order to perform a random access procedure, the UE may transmit a specific sequence via a Physical Random Access Channel (PRACH) as a preamble (S103), and may receive a response message for the random access preamble via the PDCCH and the PDSCH corresponding thereto (S104). In contention-based random access except for handover, a contention resolution procedure including transmission of an additional PRACH (S105) and reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission/reception procedure.

FIG. 2 is a view explaining a signal processing procedure for enabling a UE to transmit an uplink signal.

In order to transmit the uplink signal, a scrambling module 210 of the UE may scramble a signal to be transmitted using a UE-specific scrambling signal. The scrambled signal is input to a modulation mapper 220 so as to be modulated into complex symbols using Binary Phase Shift Keying (BPSK), Quadrature Phase Shift Keying (QPSK) or 16-Quadrature amplitude modulation (QAM)/64-QAM scheme according to the kind of the transmission signal and/or the channel state. Thereafter, the modulated complex symbols are processed by a transform precoder 230, and the processed complex symbols are input to a resource element mapper 240. The resource element mapper 240 may map the complex symbols to time-frequency resource elements used for actual transmission. The signal processed as described above may be transmitted to a BS via an SC-FDMA signal generator 250 and an antenna.

FIG. 3 is a view explaining a signal processing procedure for enabling a BS to transmit a downlink signal.

In the 3GPP LTE system, the BS may transmit one or more codewords in downlink. Accordingly, each of the one or more codewords may be processed to configure complex symbols by scrambling modules 301 and modulation mappers 302, similar to the uplink transmission of FIG. 2. Thereafter, the complex symbols are mapped to a plurality of layers by a layer mapper 303, and each layer may be multiplied by a predetermined precoding matrix, which is selected according to the channel state, by a precoding module 304 and may be allocated to each transmission antenna. The processed signals which will respectively be transmitted via antennas may be mapped to time-frequency resource elements used for transmission by resource element mappers 305, and may respectively be transmitted via OFDM signal generators 306 and antennas.

In a mobile communication system, in a case where a UE transmits a signal in uplink, a Peak-to-Average Ratio (PAPR) may be more problematic than the case where a BS transmits a signal in downlink. Accordingly, as described above with reference to FIGS. 2 and 3, downlink signal transmission uses an OFDMA scheme, while uplink signal transmission uses an SC-FDMA scheme.

FIG. 4 is a diagram explaining an SC-FDMA scheme for uplink signal transmission and an OFDMA scheme for downlink signal transmission in a mobile communication system.

A UE for uplink signal transmission and a BS for downlink signal transmission are identical in that a serial-to-parallel converter 401, a subcarrier mapper 403, an M-point Inverse Discrete Fourier Transform (IDFT) module 404 and a Cyclic Prefix (CP) adding module 406 are included.

The UE for transmitting a signal using an SC-FDMA scheme further includes a parallel-to-serial converter 405 and an N-point DFT module 402. The N-point DFT module 402 partially cancels an IDFT process influence of the M-point IDFT module 404 such that the transmitted signal has a single carrier property. FIG. 5 is a diagram explaining a signal mapping scheme in a frequency domain satisfying the single carrier property in the frequency domain. A left side of FIG. 5 shows a localized mapping scheme and a right side thereof shows a distributed mapping scheme. In the current 3GPP LTE system, a localized mapping scheme is defined.

However, as described above, in uplink, as a limit to the single carrier property based on the SC-FDMA scheme is rigidly applied to an uplink data channel or control channel design, system complexity is increased and operation flexibility deteriorates.

SUMMARY OF THE INVENTION

Accordingly, the present invention is directed to an uplink transmission control method in a system supporting an uplink multiple access scheme that substantially obviates one or more problems due to limitations and disadvantages of the related art.

An object of the present invention is to provide a method of applying multiple access schemes other than an SC-FDMA scheme to uplink data transmission Another object of the present invention is to provide a control signaling method and a method of transmitting a Reference Signal (RS), while supporting backward/forward compatibility of a conventional system, if the multiple access schemes are applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of generating an uplink reference signal in a system supporting a plurality of uplink access schemes includes, transmitting, at a base station, reference signal configuration information indicating the configuration of a reference signal to be transmitted in uplink, to a user equipment which is set to operate in an uplink access scheme corresponding to the information, wherein the reference signal configuration information is generated for each of the plurality of uplink access schemes and receiving a subframe including the reference signal generated based on the reference signal configuration information from the user equipment, wherein the reference signal configuration information includes a cyclic shift value of a sequence of the reference signal.

The reference signal configuration information may be transmitted through an uplink grant channel.

If a plurality of Resource Blocks (RBs) is non-contiguously allocated to the user equipment in a frequency domain, the reference signal configuration information includes information about different cyclic shift values for each of the plurality of RBs.

The reference signal may be a Sounding Reference Signal (SRS) or a Demodulation-Reference signal (DM-RS).

The plurality of uplink access schemes may include a scheme for transmitting an uplink signal using Single Carrier-Frequency Division Multiple Access (SC-FDMA) and a scheme for transmitting an uplink signal using clustered SC-FDMA.

The scheme for transmitting the uplink signal using the clustered SC-FDMA may include a subcarrier mapping process between a Discrete Fourier Transform (DFT) process and an Inverse Fast Fourier Transform (IFFT) process, and, in the subcarrier mapping process, DFT process output samples may be grouped into a predetermined number of sub-groups and be mapped to separate subcarrier regions in the frequency domain on a per sub-group basis.

The plurality of uplink access schemes may further include a scheme for transmitting an uplink signal using segmented SC-FDMA.

The scheme for transmitting the uplink signal using the segmented SC-FDMA may group modulation symbols of an entire time domain into a predetermined number of groups and perform a DFT process on a group unit basis, and the predetermined number may be greater than 1.

In another aspect of the present invention, a method of indicating an uplink access scheme to a user equipment in a system supporting a plurality of uplink access schemes including: receiving signal geometry information of the user equipment from the user equipment; and dynamically or semi-statically indicating an uplink access scheme suitable for the user equipment based on the received signal geometry information.

If the uplink access scheme is dynamically indicated, the uplink access scheme may be transmitted through an uplink grant channel.

If the uplink access scheme is semi-statically indicated, the uplink access scheme may be transmitted through Radio Resource Control (RRC) signaling.

The plurality of uplink access schemes may include a scheme for transmitting an uplink signal using Single Carrier-Frequency Division Multiple Access (SC-FDMA) and a scheme for transmitting an uplink signal using clustered SC-FDMA.

The scheme for transmitting the uplink signal using the clustered SC-FDMA may include a subcarrier mapping process between a Discrete Fourier Transform (DFT) process and an Inverse Fast Fourier Transform (IFFT) process, and, in the subcarrier mapping process, DFT process output samples may be grouped into a predetermined number of sub-groups and be mapped to separate subcarrier regions in the frequency domain on a per sub-group basis.

The plurality of uplink access schemes may further include a scheme for transmitting an uplink signal using segmented SC-FDMA.

The scheme for transmitting the uplink signal using the segmented SC-FDMA may group modulation symbols of an entire time domain into a predetermined number of groups and perform a DFT process on a group unit basis, and the predetermined number may be greater than 1.

In a further aspect of the present invention, provided herein is a method of transmitting control information in uplink in a system supporting a plurality of uplink access schemes including: receiving channel allocation information for transmitting the control information in uplink, at a user equipment which operates in an uplink access scheme corresponding to the information, wherein the channel allocation information is generated for each of the plurality of uplink access schemes, and transmitting, at the user equipment, the control information in uplink using resources allocated by the channel allocation information, wherein the channel allocation information allocates any one of a physical uplink control channel, a physical uplink shared channel, and a physical uplink control channel and a physical uplink shared channel according to the uplink access scheme in order to transmit the control information.

The plurality of uplink access schemes may include a scheme for transmitting an uplink signal using Single-Carrier-Frequency Division Multiple Access (SC-FDMA) and a scheme for transmitting an uplink signal using clustered SC-FDMA.

The scheme for transmitting the uplink signal using the clustered SC-FDMA may include a subcarrier mapping process between a Discrete Fourier Transform (DFT) process and an Inverse Fast Fourier Transform (IFFT) process, and, in the subcarrier mapping process, DFT process output samples may be grouped into a predetermined number of sub-groups and be mapped to separate subcarrier regions in the frequency domain on a per sub-group basis.

The plurality of uplink access schemes may further include a scheme for transmitting an uplink signal using segmented SC-FDMA.

The scheme for transmitting the uplink signal using the segmented SC-FDMA may group modulation symbols of an entire time domain into a predetermined number of groups and perform a DFT process on a group unit basis, and the predetermined number may be greater than 1.

Since a multiple access scheme is applied in addition to an SC-FDMA scheme in uplink, it is possible to relax a limit to a single carrier property based on the SC-FDMA scheme, to reduce system complexity, and to improve flexibility in system operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
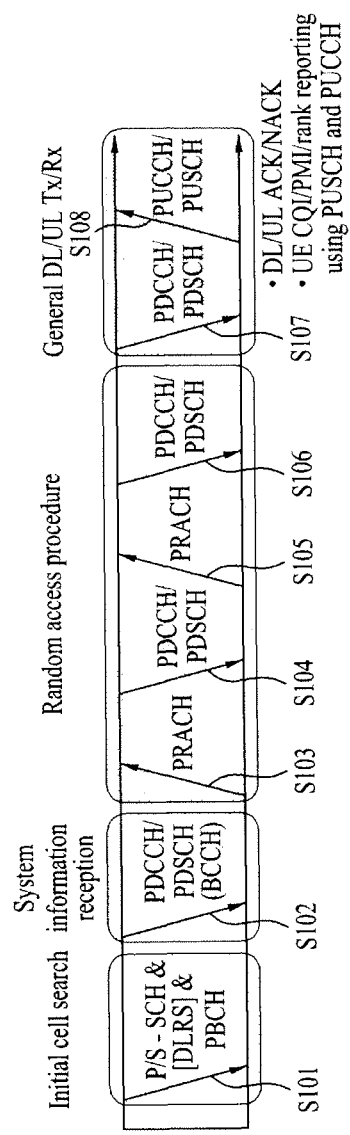
FIG. 1 is a view showing physical channels used for a $3^{rd}$ Generation Partnership Project (3GPP) Long Term Evolution (LTE) system, which is an example of a mobile communication system, and a general signal transmission method using the same.
Figure 2:
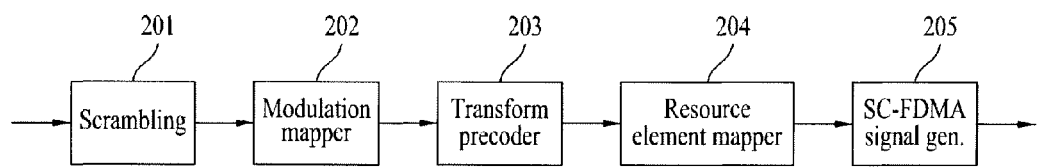
FIG. 2 is a view explaining a signal processing procedure in which a User Equipment (UE) transmits an uplink signal.
Figure 3:
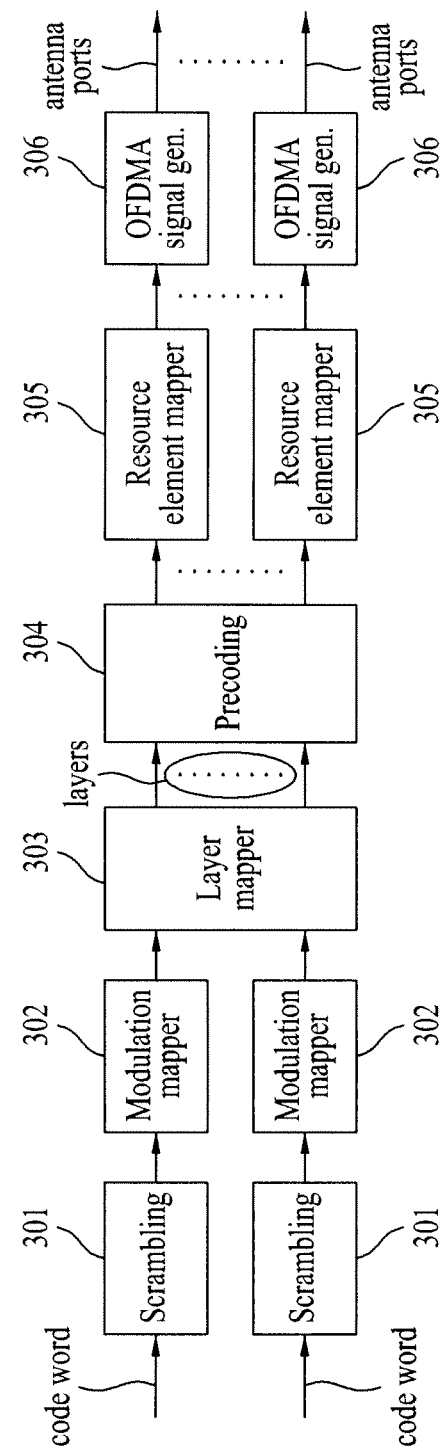
FIG. 3 is a view explaining a signal processing procedure in which a Base Station (BS) transmits a downlink signal.
Figure 4:
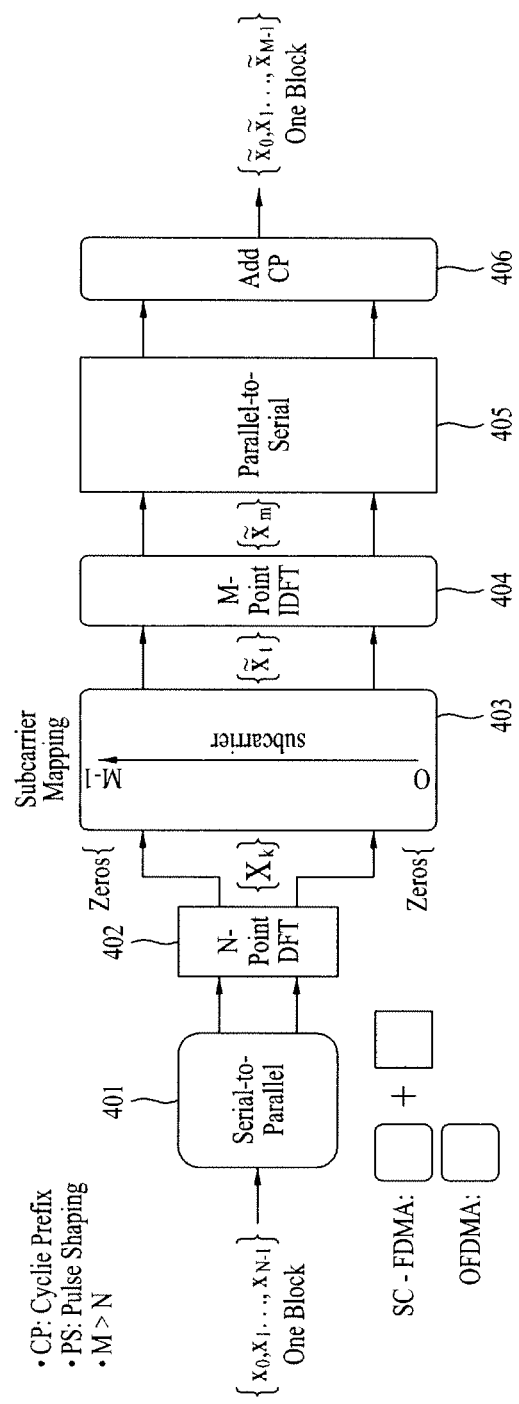
FIG. 4 is a diagram explaining an SC-FDMA scheme for uplink signal transmission and an OFDMA scheme for downlink signal transmission in a mobile communication system.
Figure 5:
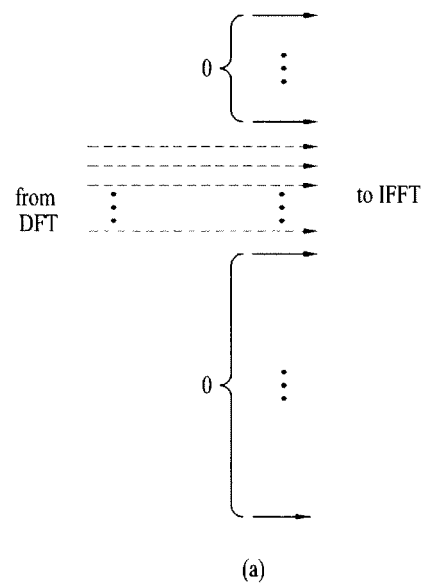
FIG. 5 is a diagram explaining a signal mapping scheme in a frequency domain satisfying a single carrier property in the frequency domain.
Figure 5:
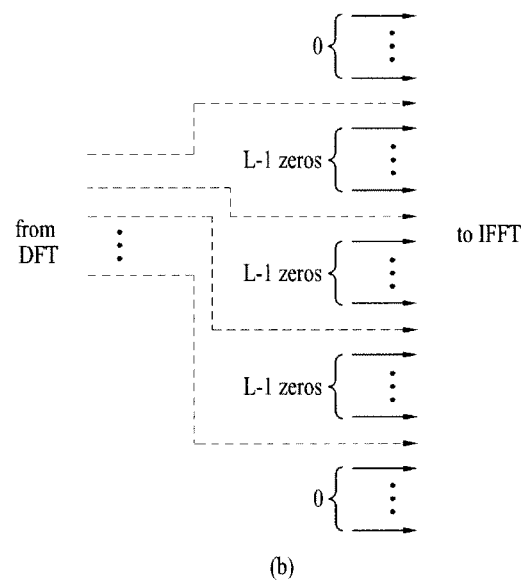

Hereinafter, the embodiments of the present invention will be described in detail with reference to the accompanying drawings so as to be easily implemented by those skilled in the art. However, the present invention may be variously implemented and is not limited to the embodiments described herein. In the drawings, in order to clearly describe the present invention, portions which are not related to the description of the present invention will be omitted and similar portions are denoted by similar reference numerals throughout the specification.

Throughout the specification, when a certain portion "includes" a certain component, this indicates that the other components are not excluded, and may be further included unless otherwise noted. The terms "unit", "-or/er" and "module" described in the specification indicate a unit for processing at least one function or operation, which may be implemented by hardware, software or a combination thereof.

The present invention relates to a scheme for efficiently obtaining optimal performance in uplink throughput and capacity in a Long Term Evolution-Advanced (LTE-A) system and proposes addition of a new uplink multiple access scheme to a Single Carrier-Frequency Division Multiple Access (SC-FDMA) scheme which is an uplink radio access scheme of LTE Release-8. First, the SC-FDMA scheme and the new uplink multiple access scheme added thereto will be described.

The new multiple access scheme includes a clustered SC-FDMA scheme (also referred to as a segmented DFT spread OFDMA scheme, that is, a segmented DFT-s-OFDMA scheme), a segmented SC-FDMA scheme (also referred to as a segmented DFT-s-OFDMA scheme) and an Orthogonal Frequency Division Multiple Access (OFDMA) scheme without a limit to a single carrier property.

The clustered SC-FDMA scheme is characterized in that, between a Discrete Fourier Transform (DFT) process and an Inverse Fast Fourier Transform (IFFT) process, DFT process output samples are divided into sub-groups in a subcarrier mapping process and are mapped to separate subcarrier regions in an IFFT sample input unit on a per sub-group basis. In some cases, a filtering process and a cyclic extension process may be included.

At this time, the sub-group may be referred to as a cluster. The term "cyclic extension" means that a guard interval longer than maximum delay spread of a channel is inserted between contiguous symbols in order to prevent inter-symbol interference (ISI) while subcarrier symbols are transmitted via a multi-path channel.

Figure 6:
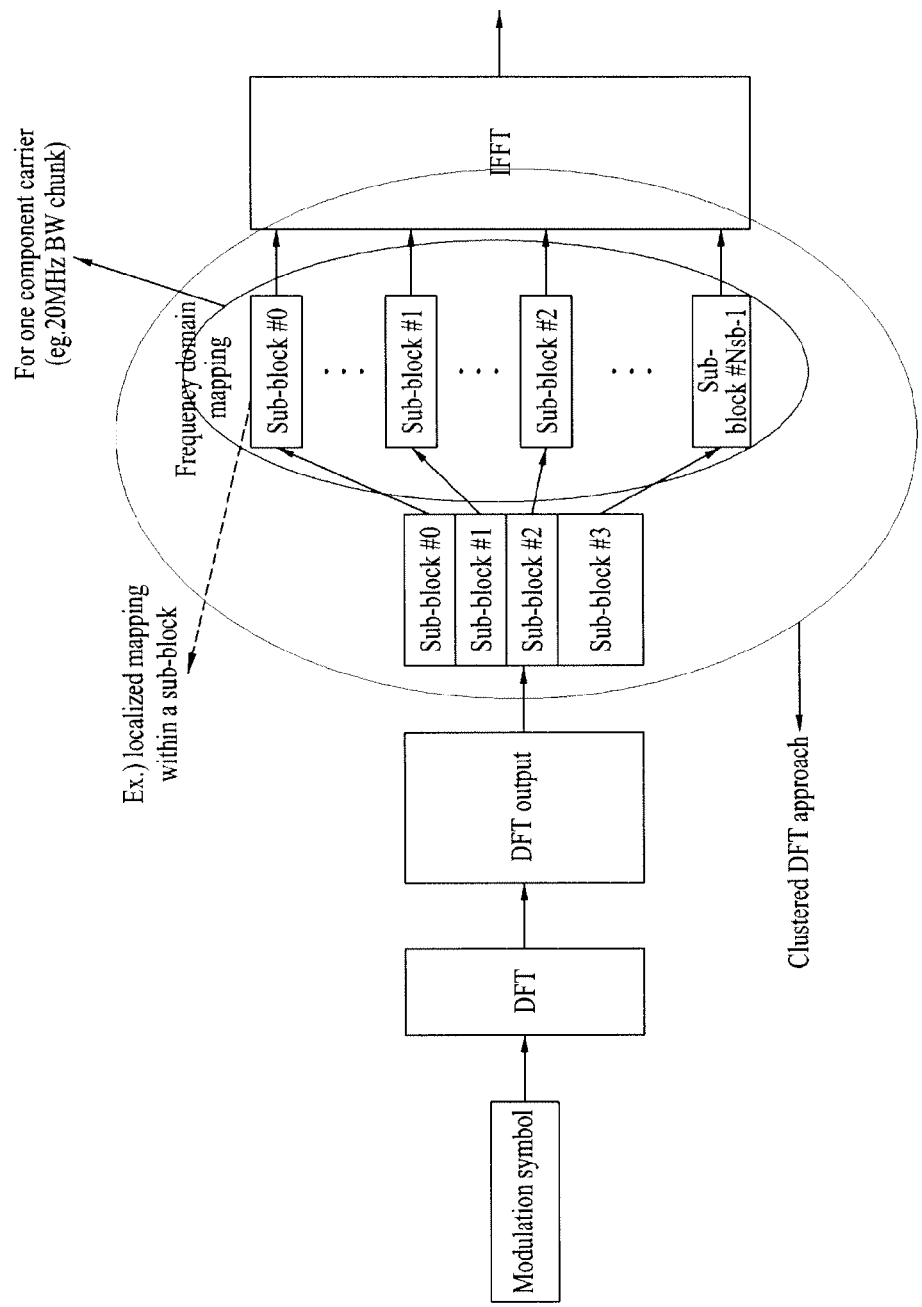
FIG. 6 is a diagram illustrating a signal processing method in which DFT process output samples are mapped to a single carrier in a clustered SC-FDMA scheme according to an embodiment of the present invention.

FIG. 6 is a diagram illustrating a signal processing method in which DFT process output samples are mapped to a single carrier in a clustered SC-FDMA scheme according to an embodiment of the present invention.

Figure 7:
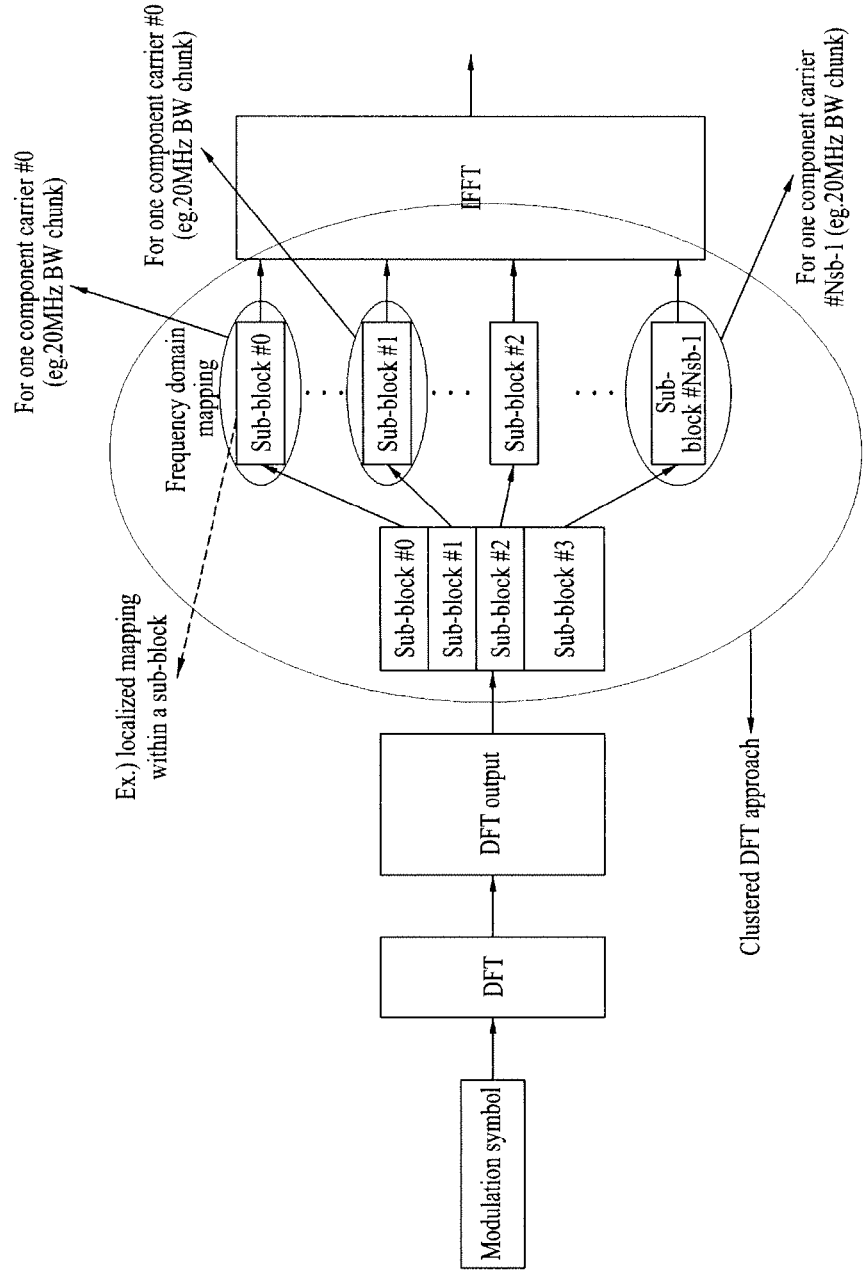
FIGS. 7 and 8 are diagrams illustrating a signal processing method in which DFT process output samples are mapped to multiple carriers in a clustered SC-FDMA scheme according to an embodiment of the present invention.
Figure 8:
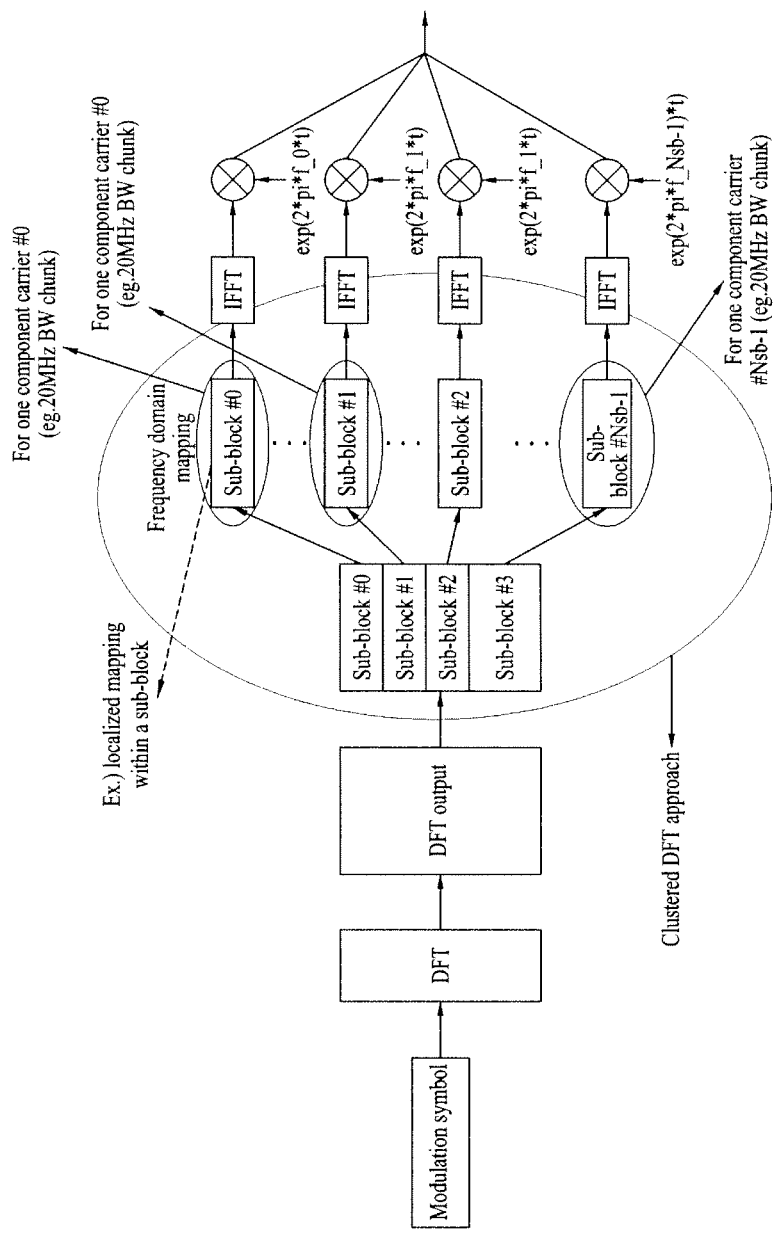

FIGS. 7 and 8 are diagrams illustrating a signal processing method in which DFT process output samples are mapped to multiple carriers in a clustered SC-FDMA scheme according to an embodiment of the present invention. FIG. 6 shows an example of applying a clustered SC-FDMA scheme to an intra-carrier and FIGS. 7 and 8 show examples of applying a clustered SC-FDMA scheme to an inter-carrier. FIG. 7 shows the case where subcarrier spacing between contiguous component carriers is set in a state in which contiguous component carriers are allocated in a frequency domain and a signal is generated by a single IFFT block and FIG. 8 shows the case where component carriers are not contiguous in a state in which component carriers are non-contiguously allocated in a frequency domain and thus a signal is generated by a plurality of IFFT blocks.

Figure 9:
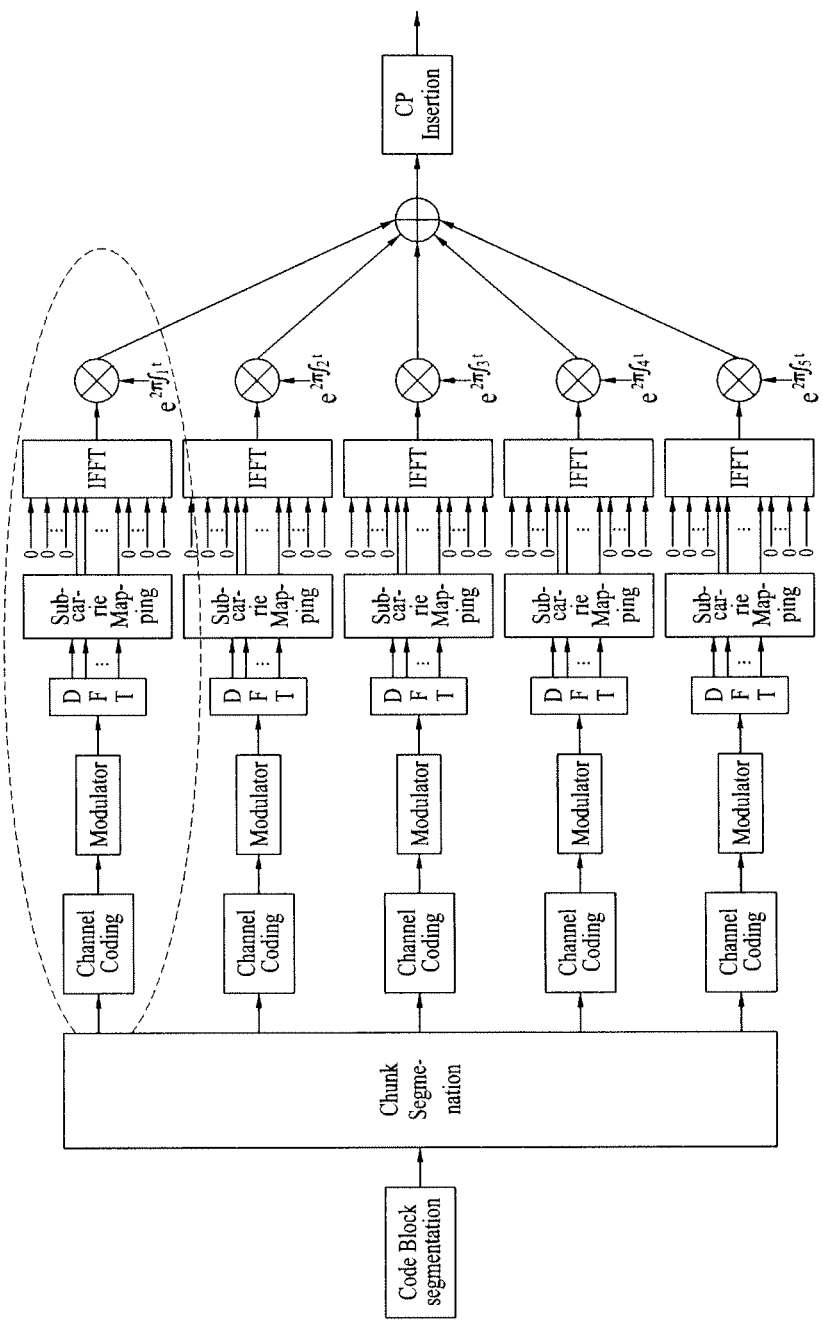
FIG. 9 is a diagram showing a signal processing method in a segmented SC-FDMA system according to an embodiment of the present invention.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended, and which is also referred to as an NxSC-FDMA or NxDFT-s-OFDMA scheme. In the present invention, the generic term "segmented SC-FDMA" is used. FIG. 9 is a diagram showing a signal processing method in a segmented SC-FDMA system according to an embodiment of the present invention. As shown in FIG. 9, the segmented SC-FDMA scheme is characterized in that modulation symbols of an entire time domain are grouped into N (N is an integer greater than 1) groups and a DFT process is performed on a group unit basis, in order to relax a single carrier property.

A scheme for additionally applying a new multiple access scheme so as to allow a User Equipment (UE) to select a transmission scheme according to a certain condition is referred to as a hybrid multiple access scheme. If the hybrid multiple access scheme is applied to a system, an RS design method for each of the multiple access schemes, a multiple access scheme selection and indication method, an inter-cell interference reduction method in an environment using different multiple access schemes in cells are required. In the following description, the above methods are proposed.

It is assumed that all the following methods satisfy backward compatibility and forward compatibility between an LTE system and an LTE-A system.

Accordingly, if a hybrid multiple access scheme is introduced, an SC-FDMA scheme defined in an LTE system among multiple access schemes supporting uplink transmission of a UE of an LTE-A system is a mandatory feature of a system and an added multiple access scheme may be an optional feature or a mandatory feature according to a specific condition.

M (M is an integer greater than 1) uplink multiple access schemes which are applicable in a system may be specified through a UE category according to UE classes.

When one or more available uplink multiple access schemes are specified as UE capabilities defined in the system according to UE classes, the available uplink multiple access schemes may be directly defined and uniquely specified as a capability parameter. If an applicable UE uplink multiple access scheme is limited on an MIMO scheme basis in a state in which a certain uplink MIMO scheme is specified as UE capabilities with respect to a part or all UE classes, one of two pieces of information for specifying an uplink MIMO scheme and an uplink multiple access scheme may be specified as a direct parameter and the other thereof may be indirectly specified in association with the direct parameter.

(1) Method of Designing a Reference Signal (RS) and a Physical Uplink Control Channel (PUCCH) in a System to which an Uplink Hybrid Multiple Access Scheme is Applied Hereinafter, a method of designing an RS and a PUCCH in a newly added uplink multiple access scheme will be described.

Hereinafter, although a clustered SC-FDMA scheme is described as the uplink multiple access scheme applied to the system in addition to the SC-FDMA scheme, the following description is applicable to an OFDMA scheme and a segmented SC-FDMA (DFT-s-OFDMA) among uplink multiple access schemes.

If the clustered SC-FDMA (DFT-s-OFDMA) (hereinafter, referred to as a clustered SC-FDMA access scheme) is applied as the newly added uplink multiple access scheme, methods of generating various patterns and RS symbols on time and frequency resource spaces in the design of a Demodulation Reference Signal (DM-RS) and a Sounding RS (SRS) may be defined.

Figure 10:
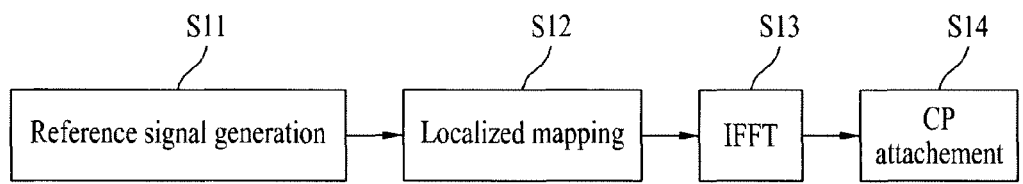
FIG. 10 is a diagram illustrating a signal processing method for transmitting a Reference Signal (RS)

FIG. 10 is a diagram illustrating a signal processing method for transmitting a Reference Signal (RS). As shown in FIG. 10, data is transmitted by generating a signal in a time domain, performing transformation by a DFT precoder, performing frequency mapping, and performing IFFT. In contrast, an RS is directly generated in a frequency domain (step 11), localized-mapped (step 12), subjected to IFFT (step 13), subjected to a CP attachment process (step 14), and transmitted, without performing DFT precoding.

Figure 11:
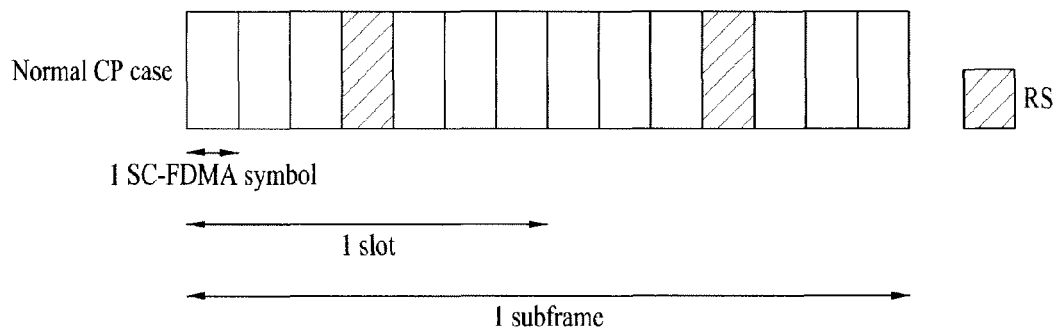
FIG. 11 is a diagram showing the structure of a subframe for transmitting an RS in a normal Cyclic Prefix (CP) case.
Figure 12:
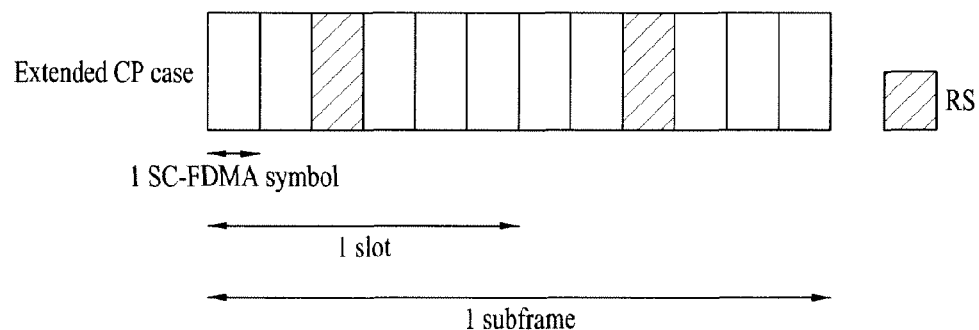
FIG. 12 is a diagram showing the structure of a subframe for transmitting an RS in an extended CP case.

FIG. 11 is a diagram showing the structure of a subframe for transmitting an RS in a normal Cyclic Prefix (CP) case, and FIG. 12 is a diagram showing the structure of a subframe for transmitting an RS in an extended CP case. The RS is transmitted through fourth and eleventh OFDM symbols in FIG. 11 and is transmitted through third and ninth OFDM symbols in FIG. 12.

Hereinafter, the RS is referred to as a DM-RS or SRS.

In a given channel state, in consideration of optimal channel estimation performance and forward and backward compatibility, if a clustered SC-FDMA access scheme is applied to LTE-A uplink transmission, an RS pattern may be specified according to the clustered SC-FDMA access scheme.

That is, in the generation of the RS pattern and the signal in the clustered SC-FDMA access scheme when the SC-FDMA scheme and the clustered SC-FDMA access scheme are selectively used by UEs within a certain cell upon LTE-A uplink transmission, interference or correlation in an RS with the SC-FDMA scheme of a adjacent cell must be minimized and compatibility between an LTE system and an LTE-A system must be maintained. In the generation of the RS pattern and the signal in the clustered SC-FDMA access scheme, the RS may be transmitted in uplink through OFDM symbols dedicated to RS transmission using Time Division Multiplexing (TDM) along with data in a UE-dedicated form. The generation of the RS pattern and the signal in the clustered SC-FDMA access scheme is characterized in that the same band as a data transmission band is used, and the RS pattern and the signal may be configured in the same form as the DM-RS and the SRS in the SC-FDMA scheme of the LTE Release-8. In an RS sequence generating and mapping method, the same RS sequence generating and mapping scheme as the RS of the LTE Release-8 is applicable based on a Zadoff-Chu (ZC) sequence which is one type of Constant Amplitude Zero Auto-Correlation (CAZAC), a computer-generated sequence having a low correlation property with respect to 1 Resource block (RB)/2 RB, or a Quadrature Phase Shift Keying (QPSK)-based random sequence.

At this time, in association with cyclic shift of a Resource Element (RE) sequence applied to a resource region divided on a frequency domain basis, the same cyclic shift may be used according to the multiple access schemes and different cyclic shifts may be used according to the multiple access schemes in order to reduce a Cubic Metric (CM) and a Peak-to-Average Power Ratio (PAPR). In an OFDMA access scheme applied to uplink transmission of a certain LTE-A UE, in the case of a normal CP and an extended CP, OFDM symbols for transmitting data are not subjected to a DFT spreading process before an IFFT process. A ZC sequence which is one type of CAZAC sequence based on a predetermined cyclic shift and root index may be mapped to OFDM symbols dedicated to RS transmission based on a band thereof before being input to an IFFT process.

In consideration of the fact that interference of the clustered SC-FDMA transmission of the UE in a neighboring cell is low in a state in which there is a limit to power boosting of an RS in uplink transmission and UEs which can perform clustered SC-FDMA transmission are limited to UEs close to a BS, a mapping location (e.g., different OFDM symbols) in resources of a DM-RS and SRS, a multiplexing scheme, and a sequence applied to the RS, all of which are different from those of the SC-FDMA scheme, may be used in the clustered SC-FDMA multiple access scheme.

In this case, a cyclic shift index field of an uplink grant channel, that is, an uplink grant physical downlink control channel, for uplink transmission may include unique sequence index information used for RS transmission. In resource allocation of downlink Physical Hybrid Automatic Repeat Request Indicator Channel (PHICH) for uplink transmission, a PHICH group index and/or a PHICH resource index within the PHICH group may be determined based on the sequence index. In consideration of the bit size of a cyclic shift index field of the uplink grant channel, the number of unique indexes of the RS sequence in the uplink clustered SC-FDMA access scheme may be set to be equal to or less than the number of cyclic shifts in the ZC sequence indicated by the index field in the SC-FDMA environment of the conventional LTE system. For example, if the bit size of the cyclic shift index field of the uplink grant channel is 3 bits, the number of RS sequence indexes of the uplink clustered SC-FDMA access scheme may be set to 8 or less. If the segmented SC-FDMA scheme or the clustered SC-FDMA is used as the multiple access scheme, the ZC sequence of one cyclic shift index may be used as the DM-RS sequence. However, a situation in which ZC sequences of a plurality of different cyclic shifts are necessary may occur.

For example, if a segmented SC-FDMA scheme or a clustered SC-FDMA or OFDMA scheme is used for uplink transmission, resource blocks may be non-contiguously allocated in a frequency domain. RS sequences (for example, ZC sequences) having different cyclic shifts according to frequency resource groups composed of one or more resource blocks non-contiguously allocated in the frequency domain for a low CM and PAPR may be generated and mapped.

If the above situation occurs due to uplink multiple antenna transmission, a scheme for newly defining a format for transmitting all individual cyclic shift information or transmitting only one cyclic shift value through an uplink grant channel using the conventional method and deriving the remaining indexes of the one or more cyclic shifts based on a fixed offset or a predefined rule may be applied.

At this time, the number of cyclic shifts may be limited by a certain system condition (for example, a maximum number of separated processing blocks or the number of multiple antennas in the case of the segmented SC-FDMA or the clustered SC-FDMA).

In this case, in the case where a single codeword is applied as an uplink Single User-Multiple Input Multiple Output (SU-MIMO) and in the case where a multiple antenna transmit diversity scheme or a single antenna transmit scheme is applied, the downlink PHICH group index and/or PHICH channel index may be determined by a certain rule based on the cyclic shift value transmitted through the uplink grant channel. For example, if one cyclic shift index value is indicated in a field and is transmitted through the uplink grant channel, the downlink PHICH group index and/or the PHICH channel index may be determined based on the index value. If a plurality of cyclic shift index values is indicated in a field and is transmitted through the uplink grant channel, the downlink PHICH group index and/or the PHICH channel index may be determined based on one index value of an arbitrary order of the plurality of index values. For example, a first cyclic shift index value may be selected and applied or the last cyclic shift index value may be selected and applied and the downlink PHICH group index and/or the PHICH channel index may be determined based on the selected cyclic shift index value. If multiple codewords are applied to the uplink SU-MIMO, up to R-th cyclic shift values corresponding in number to the number R of codewords, which are obtained using one of the above two methods, may be individually applied when R PHICH channel indexes are indicated. Alternatively, a scheme for selecting arbitrarily specified N cyclic shift index values when there are cyclic shift index values directly specified through S ($S \geq R$) uplink grant channels or indirectly specified by a certain rule or offset may be applied.

The following three cases of the indication method of the cyclic shift index of the DM-RS on the uplink channel will be described.

1) First Case

In the first case, in the implementation of the conventional uplink SU-MIMO, there is a need for RSs for providing channel estimation for demodulation and decoding of p ($p \leq m$) reception data streams according to a transmission (Tx) antenna/layer configuration of a UE in which m representing the number of transmission antennas (virtual antennas or physical antennas) or the number of transmission layers is 2 or 4. At this time, q ($q \leq p$) RSs among the P RSs may be specified as the cyclic shift version of the QPSK-based computer-generated sequence of a low correlation property of the case of 1RB/2RB or the CAZAC base sequence having the length of a region for data transmission on frequency subcarriers in certain OFDM (DFT-s-OFDMA including the clustered SC-FDMA or segmented SC-FDMA) symbols (one OFDM symbol may be specified using the TDM or a plurality of OFDM symbols may be indicated using another method, for RS transmission).

At this time, RS indexes which are used as a criterion for indicating the q used cyclic shift indexes may have 3 bits. As the remaining q-1 cyclic shift indexes are automatically specified using an offset, which is variably specified according to system circumstances by an arbitrary rule, a fixed offset or a fixed selection rule, it is possible to minimize overhead when the UE signals the used cyclic shift indexes.

2) Second Case

In the second case, as described in the first case, a combination of cyclic shift values for the remaining q-1 RS cyclic shift values different from the RS cyclic shift indexes values which are used as a criterion for signaling q RS cyclic shift indexes may be specified or q RS cyclic shift indexes may be specified as 3+a ($0 < a < 3*(q-1)$) bits using a certain information compression rule. At this time, for example, a may be defined as a bit value of a sum of values (values less than 3 bits) representing a difference between RS indexes and the RS cyclic shift indexes which are used as a criterion.

3) Third Case

In the third case, as described in the first case, q RS cyclic shifts are explicitly specified on the uplink grant channel with respect to q RSs. In this case, the size of the RS cyclic shift field in the control information payload of the uplink channel may be 3*q if the bit size of the individual cyclic shift field is 3 bits.

If p and q are the same in the first cases, RSs of the QPSK-based computer-generated sequences defined in the conventional LTE system having a low correlation property of 1RB/1RB or CAZAC base sequence of a data band in one or more OFDM (DFT-s-OFDMA schemes including the clustered SC-FDMA or the segmented SC-FDMA) symbols are used as all RSs for all antennas (in the following description of the present invention, including virtual antennas, physical antennas and transmission layers). In the first case, if p and q are different, as the number of cyclic shifts which can be provided such that the CAZAC RS sequences transmitted through a certain OFDM (DFT-s-OFDMA including the clustered SC-FDMA or the segmented SC-FDMA) symbols are orthogonal, in a state in which the p RS cyclic shifts are not sufficient to enable allocation of one OFDM symbol to each slot, OFDM symbols for transmitting a plurality of RS sequences are allocated as in the first case and QPSK-based computer-generated sequences defined in the conventional LTE system having a low correlation property of 1RB/2RB or the additional CAZAC RS sequences may be continuously allocated.

However, since such an allocation scheme directly deteriorates uplink throughput, heterogeneous RSs having low overhead, which are generated using different methods, are used along with the q CAZAC or computer-generated RSs. The number of heterogeneous RSs is set to p-q which is equal to or greater than 0. At this time, for entire overhead adjustment, q may be 0.

As the embodiment of the design of the RS different from the conventional TDM (OFDM symbols)-CDM (CAZAC/computer-generated) sequences, a scheme for inserting RSs into a time sample region within arbitrary transmission symbols or r (r≥1) predetermined time domain symbol positions at a previous state of the DFT in the case where the SC-FDMA, the clustered SC-FDMA (may be referred to as DFT-s-OFDMA) or the segmented SC-FDMA is used as the uplink access scheme may be considered.

In this case, the RSs inserted into the time domain are subjected to spread spectrum spreading to all subcarriers of the frequency domain within the DFT region through DFT, are subjected to IFFT, are transmitted to a receiver through a channel, and are subjected to FFT and IFFT in the receiver, thereby extracting channel information of the antenna on a band for transmitting data from r RSs of the symbol positions.

A scheme for directly mapping RS sequences to a frequency domain without performing DFT and performing IFFT with respect to the mapped RS sequences and a scheme for directly mapping RS sequences to an OFDM symbol region on a next stage of IFFT may be applied. At this time, the OFDM symbol region may be the entire OFDM symbol region or a partial time sample region of the OFDM symbols. In the case where RSs are inserted into OFDM symbols for transmitting data, the fixed positions in the OFDM symbols may be specified and the RSs are inserted at the fixed positions or the RSs may be inserted at positions generated from resource block indexes and/or cell IDs according to a certain rule. In the case where overhead of additional RSs is added, from the viewpoint of data multiplexing, resources to which RSs will be mapped may be secured using puncturing of symbols for transmitting data or rate matching.

The uplink RS design scheme is applicable not only to the uplink SU-MIMO scheme but also to non-spatial multiplexing schemes. In the case of DM-RS, different OFDM symbols may be additionally defined in a state in which DM-RS transmission OFDM symbols designed based on the conventional TDM-CDM are present. Alternatively, OFDM symbols with which DM-RS transmission OFDM symbols designed based on the conventional TDM-CDM are replaced may be defined. The uplink RS design scheme is applicable to not only the DM-RS but also the SRS. If the OFDM scheme is applied to uplink transmission, a pattern in which RSs are inserted at fixed frequency subcarrier positions within resource blocks in resource block units may be defined. Such a pattern may be cell-specifically defined by a certain function or rule using a cell ID as an input signal. The resource block includes both a virtual resource block and a physical resource block. Accordingly, RSs may be inserted upon symbol mapping before IFFT input of the transmitter. If RSs are inserted into one or more OFDM symbols for transmitting data, the RSs may be inserted into fixed positions or positions generated from a resource block index and/or cell ID by a certain rule. At this time, resources to which RSs will be mapped may be secured using puncturing of symbols for transmitting data or rate matching.

In a certain system, with respect to p-q RSs among p RSs, in an environment in which an RS transmission scheme different from the conventional TDM-based CAZAC RS transmission scheme is applied, for a certain purpose, a scheme for transmitting RSs on a per transmission antenna or transmission layer basis and a scheme for allocating an index may be considered. Tx antenna/layer configuration may vary according to UEs. For example, in the case of 2Tx antenna configuration or 2-layer transmission, antenna port indexes or layer port indexes #i and #(i+1) are specified on a per transmission antenna or transmission layer basis (i≥0). As another example, in the case of 4Tx antenna configuration or 4-layer transmission, antenna port indexes or layer port indexes #i, #(i+1), #(i+2) and #(i+3) may be specified on a per transmission antenna or transmission layer basis. At this time, a scheme for applying the TDM-based CAZAC or computer-generated RSs with relatively excellent channel estimation performance to q antenna ports from a low antenna port index in ascending order, generating sequences using a method different from the above method and applying RSs mapped to physical resources to the remaining antenna ports is proposed.

In addition to content of the uplink grant channel, SRS should be generated and applied on a per antenna port or layer port basis according to the uplink Tx antenna/layer configuration even in SRS design. At this time, in order to provide extended multiplexing capacity, the transmission period of the SRS per antenna port may be adjusted and defined in the time domain. In one embodiment of the present invention, under the condition that the same multiplexing capacity is provided in the same sequence design environment as the SRS of a single antenna is provided to p transmission antennas or transmission layers, the transmission periods of the SRSs of the time domain of a certain UE are equal and a method for sequentially transmitting the SRS per antenna or layer of the UE is applicable. Alternatively or simultaneously, SRS code for providing the extended capacity may be designed in association with a frequency domain distributed comb scheme so as to support efficient CDM/FDM multiplexing capacity. In greater detail, in consideration of a part or all of low correlated root indexes v of the sequences in a state in which not only cyclic shift u available in the code sequence level and the sequence level is scrambled, code sequence resources may be increased v-fold. At this time, the part of the low correlated root indexes may indicate root indexes corresponding to the base sequences within a group if uplink DM-RSs are grouped. The low correlated root indexes are transmitted to the UE through L1/L2 control signaling or higher-layer RRC signaling.

At this time, if subcarriers, which are physical resources to which sequence elements are mapped, are mapped at a fixed offset interval using the distributed comb scheme, a comb offset value may be adjusted according to channel conditions, SRS transmission load or time required for channel sounding. Alternatively or simultaneously, a limited sounding band (e.g., 5 MHz) is specified with respect to the entire system bandwidth (e.g., 20 MHz) to which the SU-MIMO is mapped, sounding and packet scheduling are performed within the limited band and a virtual sub system band for a plurality of uplink SU-MIMO schemes is divided and used, thereby supporting multiplexing capacity in the frequency domain. The offset value or the sounding band of the distributed comb scheme is transmitted to the UE through L1 (first layer)/L2 (second layer) control signaling or higher-layer RRC signaling.

In uplink transmission, an uplink SRS transmission method needs to be considered with respect to the UE which performs transmission using the clustered SC-FDMA (DFT-s-OFDMA) scheme or the segmented SC-FDMA (DFT-s-OFDMA) in which a single carrier property is not maintained. Hereinafter, this method will be described. Although clustered SC-FDMA scheme is described as the uplink multiple access scheme applied to the system in addition to the SC-FDMA scheme, the following description is applicable to the OFDMA scheme and the segmented SC-FDMA scheme among the uplink multiple access schemes.

In SRS transmission of the UE which performs uplink transmission based on clustered SC-FDMA scheme, a sounding band of an entire system band may be set and a scheme for performing channel sounding may be included. The entire system band may include one uplink component carrier in a carrier aggregation situation, one or more component carriers, or all component carriers configuring a cell or a base station.

In SRS transmission of the UE, a sounding scheme for transmission using a portion of the system band, for example, a subband, may be included. At this time, one or more subbands having a size of 4 RBs or another RB size may be added. This may be referred to as subband sounding.

In order to smoothly perform FDM/CDM multiplexing on SRS symbols between an LTE-A UE for performing uplink transmission using the clustered SC-FDMA scheme and a conventional LTE UE using the SC-FDMA scheme maintaining a single carrier property, the LTE-A UE which can use the clustered SC-FDMA scheme supports the SRS bands setting and multiplexing scheme defined in the conventional LTE system, and configures the SRS transmission scheme based on RRC parameters uniquely signaled per UE and cell for the higher-layer (RRM) configuration. In addition, the SRS band setting and multiplexing scheme of the LTE-A system may be additionally defined. This scheme is applicable if unique SRS transmission frequency resources and/or time domain resources for LTE-A UEs are defined.

The following methods are proposed with respect to the unique SRS band setting, resource allocation and multiplexing scheme of the LTE-A for the application of the clustered SC-FDMA scheme. Hereinafter, although the band setting, resource allocation and multiplexing scheme described in the present invention are described as being based on the SRS sequences, as necessary, they may be applied as the multiplexing scheme or resource allocation of DM-RS (for channel estimation used for demodulation and decoding of the uplink received signal of the base station) sequences.

1) First Method

If a plurality of uplink component carriers is set in a certain UE, in order to reduce signaling overhead, an uplink SRS sequence generated in the form of a ZC sequence may be an RS sequence having the same cyclic shift with respect to all component carriers. At this time, root indexes may be the same with respect to all component carriers.

2) Second Method

If a plurality of uplink component carriers is set in a certain UE, in order to reduce CM and PAPR, an uplink SRS sequence generated in the form of a ZC sequence may be a sequence having different cyclic shift with respect to all component carriers. At this time, root indexes may be the same or different with respect to all component carriers. At this time, other cyclic shift and root index values differently applied according to uplink component carriers are constant with respect to the cyclic shift index and root index values of the SRS sequence specified on a certain uplink component carrier which is set as a criterion, or the cyclic shift index and root index values of the SRS sequence on other uplink component carriers may be set based on a series of fixed or variable offsets according to a predefined (for example, grouping) value setting rule.

3) Third Method

If a plurality of uplink component carriers is set in a certain UE, in order to maintain a CM/PAPR of a signal transmitted by the UE in a single carrier situation, subframes for transmitting an uplink SRS may be differently allocated according to uplink component carriers. At this time, although the sounding band size and sounding band frequency location may be the same in terms of component carriers, they may be independently configured on a per component carrier basis according to a specific situation or purpose. For example, when the period of the subframes for transmitting the SRS within the uplink component carriers is set, the SRS transmission period is the same in the uplink component carriers. As the offset is defined by one or more subframe levels in the unique time domain of the component carriers based on carrier indexes or other information, a certain UE may transmit the SRS of one uplink component carrier through a certain subframe. The offset value may be a time required for sounding the entire band in a certain component carrier. If sounding band hopping is applied, the offset value may be calculated in consideration of the number of times of SRS transmission for sounding of the entire band. The third method may be applied to the first method and the second method.

4) Fourth Method

If a plurality of uplink component carriers is set in a certain UE, in order to reduce system complexity and signaling overhead, a subframe for transmitting an SRS may be equally allocated to uplink component carriers. At this time, although the sounding band size and the sounding band frequency location may be the same in the component carriers, they may be independently configured on a per component carrier basis. In a state in which a series of UE-specific and carrier-common signals is transmitted through a certain primary carrier or a cell-specific signal is transmitted through a downlink component carrier, a part or all SRS transmission parameters may be equally set in the component carriers. Thus, as at least the SRS transmission period is the same in the uplink component carriers and the start time thereof is the same, the certain UE may transmit the SRS of all uplink component carriers to be sounded through a certain subframe. This method is applicable to the first method or the second method.

5) Fifth Method

Figure 13:
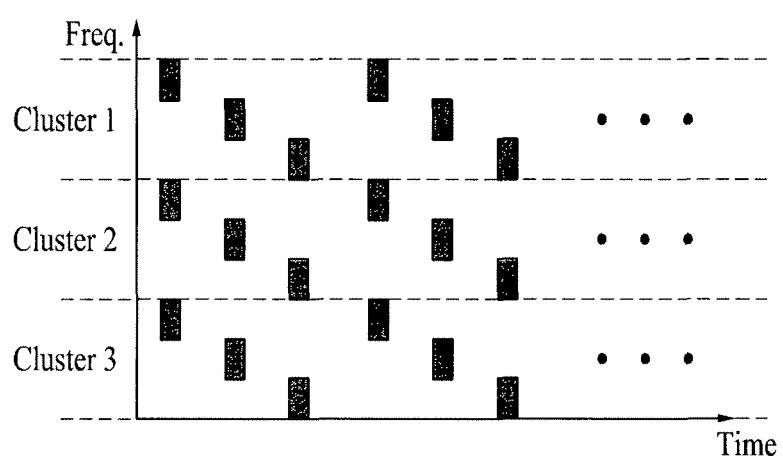
FIGS. 13 and 14 are diagrams showing a cyclic SRS hopping pattern according to an embodiment of the present invention.
Figure 14:
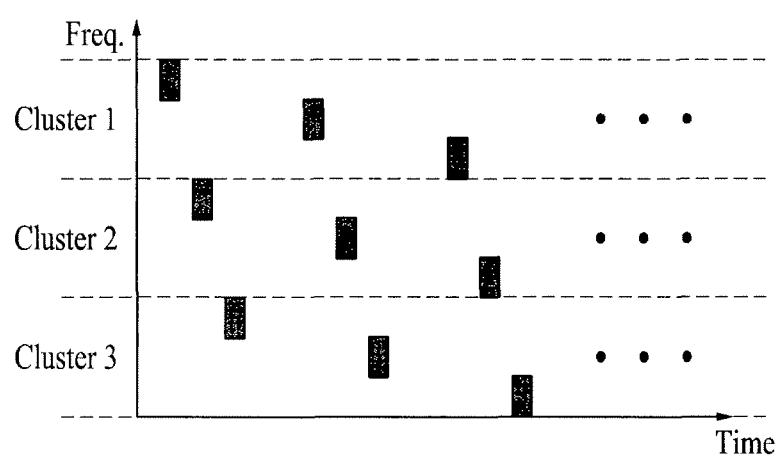

In the case where an uplink transmission mode of a certain UE using a certain component carrier in the clustered SC- FDMA scheme is set and the number of clusters is N (N≥1) within a carrier band, in SRS transmission, if an SRS in the entire carrier band or a cluster frequency band size is not transmitted but the SRS on a smaller band is transmitted, an SRS band hopping method used in the conventional LTE system (that is, a method of sequentially cyclic-shifting a sounding band) may be preferably applied in order to support backward compatibility. However, in a certain duration, for the purpose of providing uniform sounding per N clusters, a separate SRS band hopping method is applicable. FIGS. 13 and 14 are diagrams showing a cyclic SRS hopping pattern according to an embodiment of the present invention. A separate cyclic SRS hopping pattern of a cluster unit may be applied. At this time, as shown in FIG. 13, SRS transmission of clusters may be simultaneously performed. Alternatively, as shown in FIG. 14, SRS transmission of clusters may alternately performed. In the cyclic SRS hopping pattern, the conventional sequential hopping scheme may be applied within clusters.

(2) Method of Designing a Physical Uplink Control Channel (PUCCH) Used to Transmit Uplink Control Information if a Certain UE in an LTE-A System Performs Uplink Transmission Using an OFDMA Access Scheme In the case where a certain UE in the LTE-A system performs uplink transmission using an OFDMA access scheme, a method (hereinafter, referred to as Method 1) of separately designing a PUCCH used to transmit uplink control information and a method (hereinafter, referred to as Method 2) of using a PUCCH of the LTE Release-8 without change may be considered. The following methods are proposed based on the two above-described methods, under the condition that only control information is transmitted and under the condition that both control information and data are transmitted. In the present embodiment, although the OFDMA scheme is described as the uplink multiple access scheme applied to the system in addition to the SC-FDMA scheme, the following description is equally applicable to the segmented SC-FDMA scheme and the clustered SC-FDMA scheme among the uplink multiple access schemes.

1) Condition that Only Control Information is Transmitted

In order to prevent system complexity from being increased when a UE using an OFDMA access scheme additionally configures a separate control channel used to transmit only control information in a state in which data to be transmitted is not present, all PUCCH formats defined in LTE Release-8 are used without change.

For optimal scheduling gain for the OFDMA access scheme, resource allocation flexibility of an uplink control channel and capacity load reduction, a new uplink PUCCH format and resource allocation scheme may be introduced. In one embodiment of the present invention, in the OFDMA access scheme, resources used to transmit a control channel are allocated through a series of uplink grant signals (the series of uplink grant signals is transmitted to a UE through separate higher-layer (RRC) signaling or L1/L2 control signaling and an existing uplink grant channel for data transmission may be used without change) and control information may be transmitted on these resources using the OFDMA scheme.

At this time, in the case where resources which are integer multiples of minimum frequency resource granularity of data transmission are allocated to the control information using the same modulation scheme as data transmission, a scheme for configuring a modulation symbol stream according to a multiplexing chain process using the same method as PUSCH transmission based on convolution coding and transmitting the modulation symbol stream after performing the same OFDMA-based baseband processing as the PUSCH may be used.

In some cases, a separate channel coding and modulation scheme for transmitting control information having a small size is proposed when the OFDMA-based multiple access scheme is used. A modulation symbol stream generated using a separate modulation scheme may be sent through resources specified according to uplink grant.

In addition, in the OFDMA access scheme, a scheme for utilizing the formats of the LTE Release-8 with respect to some PUCCH formats and designing a separate control channel using the technique of Method 1 with respect to the other PUCCH formats may be applied. In one embodiment of the present invention, if a certain UE uses an OFDMA access scheme, a slightly modified version of the PUCCH format of LTE Release-8, such as a format in which the number of RS transmission symbols is reduced, may be used as a scheme for utilizing the PUCCH formats of LTE Release-8 without change or utilizing a redundant symbol space (a certain control channel format is defined by the capacity of control information transmittable by a certain UE or the capacity of control information transmittable by all UEs) according to the extension of the information size of the control channel.

On the assumption that a UE may use the OFDMA scheme within a cell in a non-power limit state, channel state information (including CQI, PMI, rank, and other channel/interference information measured by the UE), which must be fed back to the base station, may be increased, compared with the LTE Release-8, according to the use of an enhanced MIMO scheme or a developed scheme in LTE-A downlink transmission (e.g., downlink transmission based on rank 4 or more using eight transmission antennas). In order to provide a channel having increased information capacity, a new channel may be designed based on the OFDMA access scheme.

As an embodiment of a channel design for channel state information feedback, a feedback request flag for channel state information and/or resource allocation for control channel transmission through uplink grant may be received using the OFDMA access scheme and control information may be transmitted through resources using the OFDMA scheme. At this time, if resources of an integer multiple of minimum frequency resource granularity of data transmission are allocated to control information using the same modulation scheme as the modulation scheme applied to data, a scheme for configuring a modulation symbol stream by a multiplexing chain process using the same method as the general PUSCH transmission based on convolution coding and transmitting the modulation symbol stream after performing the same OFDMA-based baseband processing as the PUSCH may be used. In some cases, a separate channel coding and modulation scheme for transmitting control information having a small size is proposed when the OFDMA-based multiple access scheme is used. A modulation symbol stream generated using a separate modulation scheme may be sent through resources specified according to uplink grant.

2) Condition that Both Control Information and Data are Transmitted

In the conventional LTE system, under the condition that both control information and data are transmitted, in a state in which resources used to transmit control information and data through a PUSCH channel are allocated, the control information and the data are multiplexed through rate matching or puncturing.

Figure 15:
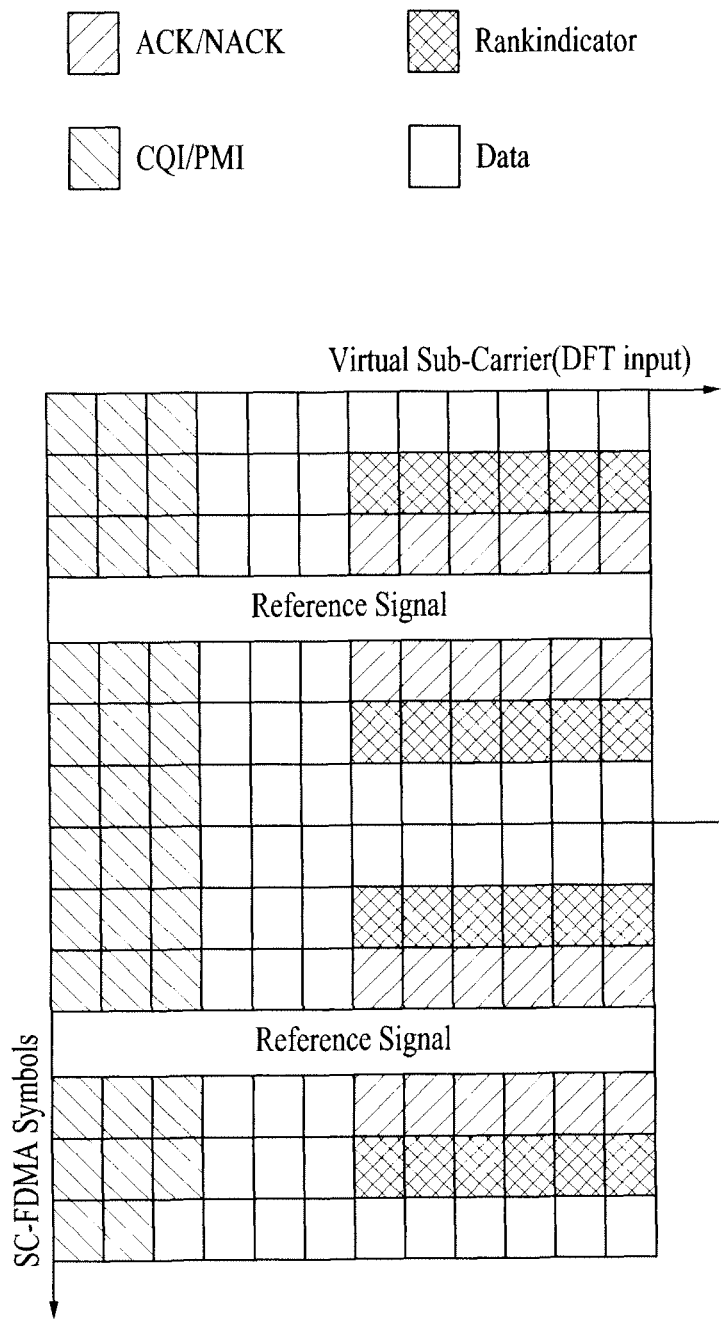
FIG. 15 is a diagram showing a subframe in which control information and data on a PUSCH are mapped in LTE Release-8.

FIG. 15 is a diagram showing a subframe in which control information and data on a PUSCH are mapped in LTE Release-8. In LTE Release-8, a conventional scheme for multiplexing control information and data on the PUSCH channel is applicable to uplink transmission of an LTE-A UE which must maintain a single carrier property in a power limit state and a situation in which control information piggybacks on data. In the LTE-A system, if a multiple access scheme which does not maintain a single carrier property, such as an OFDMA scheme, a segmented SC-FDMA scheme or a clustered SC-FDMA scheme, is applied, resource blocks for transmitting the data and the control information are divided according to resource blocks in the case of the OFDMA scheme, and blocks for transmitting the data and the control information may be divided according to segmented subcarrier blocks or clustered subcarrier blocks used for transmission in the case of the segmented SC-FDMA scheme or the clustered SC-FDMA scheme.

The resource blocks for transmitting the data are resource blocks to which one or more PUSCHs are mapped for data transmission and the resource blocks for transmitting the control information indicate resource blocks to which one or more PUCCHs (transmitted using 1 or more RBs), one or more PUSCHs or a combination of one or more PUCCHs and one or more PUSCHs are mapped, for control information transmission. At this time, a PUSCH is transmitted through the block for transmitting the data and a certain physical control channel designed for control information transmission including the LTE Release-8 PUCCH format is simultaneously transmitted in the same uplink subframe through the block for transmitting the control information. In this case, in the uplink grant channel, a resource allocation field for data and a resource allocation field for control information may be explicitly defined, and the resource allocation scheme of the conventional LTE system may be used without change. If the resource allocation scheme of the conventional LTE system is used without change, the resource blocks for transmitting the control information and the data may be implicitly indicated using one resource allocation field.

As the embodiment in which the resource allocation scheme of the conventional LTE system is used without change, the number of fixed resource blocks may be differently set according to channel state, that is, required MCS value. Alternatively, on the assumption that the number of resource blocks required for control information in each transmission scheme is fixed to P in advance, the first or last resource block of the P resource blocks on the frequency resource block index may be used for control information transmission and the other resource blocks may be used for data transmission.

Alternatively, a certain pre-defined rule may be used and a scheme for multiplexing control information and data within a predetermined (P+1)-th resource block without dividing the control information and the data in resource block units may be applied.

(3) Method of Indicating a Multiple Access Scheme in an Uplink Hybrid Multiple Access System An LTE-A UE may select an SC-FDMA scheme and other multiple access schemes according to circumstance. Support/non-support of a plurality of multiple access schemes may be defined as an additional class in a UE category (that is, UE class). Information about the UE is sent to a base station (eNode B) or a network upon cell registration and is sent from a serving eNode B to a target eNode B upon handover.

The eNode B may select one from among a plurality of multiple access schemes based on measured information sent by the UE within a certain cell and indicate the selected multiple access scheme to the UE.

At this time, a method of semi-statically or dynamically switching the multiple access scheme is applicable. In order to prevent the multiple access mode from being more frequently switched, if a reliable result is derived through long-term measurement of received signal quality (geometry) information based on the received power intensity of the UE or a Signal to Interference plus Noise Ratio (SINR) and the multiple access scheme is semi-statically switched based on the result, a method of defining a 1-bit L1 (first layer) parameter for the multiple access scheme as a Radio Resource Control (RRC) signaling parameter and sending the information to the UE through RRC signaling or higher-layer signaling is applicable.

In order to implement optimal transmission with respect to the received signal quality information of the UE and/or the band allocation state of the scheduler, a 1-bit multiple access scheme indication field may be defined in the uplink grant channel for indicating information about the multiple access scheme transmitted to the UE in downlink, and the information may be transmitted to the UE through L1 (first layer)/L2 (second layer) control signaling. As another method of L1/L2 control signaling, a method of representing the 1-bit information on the multiple access schemes of several UEs by a bitmap in units of one or more groups, defining the information in a unique DCI format of a PDCCH and transmitting the information is applicable.

The information about the multiple access scheme and the transmit power command information of the UE may be multiplexed, and may be defined in and transmitted through a PDCCH.

A time when the UE which receives the use of a specific uplink multiple access scheme through RRS signaling or L1/L2 control signaling (uplink grant channel) changes the multiple access scheme used for uplink transmission may be generally determined according to a time when RRC signaling or L1/L2 control signaling (uplink grant channel) defined in the LTE system or the LTE-A system is applied, a predetermined rule, or an offset separately set in a fixed time domain.

As a method of indicating a multiple access scheme applied to the UE through the PDCCH through L1/L2 control signaling, the following methods may be used.

1) First Method

In the first method, a field indicating a $\lceil \log_2 N \rceil$-bit (N denotes the number of applicable uplink multiple access schemes) multiple access scheme in all DCI formats or some DCI formats for uplink grant channel transmission of the PDCCH may be explicitly defined. In addition, if a payload size is different from the payload size of the conventional DCI format for uplink grant, additional one or more DCI formats including the above field may be set.

2) Second Method

A method which better supports forward or backward compatibility between the LTE system and the LTE-A system than the first method is proposed. In the current LTE system, an uplink grant signal is supported by one format, that is, a DCI format 0. In this method, one or more DCI formats dedicated to the LTE-A system including a field indicating a $\lceil \log_2 N \rceil$-bit multiple access scheme for overriding the eNode B may be additionally set. At this time, the term "overriding" means that eNode B arbitrarily indicates the multiple access scheme of the UE in a certain instance.

3) Third Method

If there is a strong correlation between an uplink MIMO scheme and/or the number of transmission layers (also referred to as a rank) and a multiple access scheme in the first method and the second method, a field indicating at least one of information indicating the MIMO scheme and/or the transmission layer number (rank) and information indicating the multiple access scheme is included, and a new DCI format in which the information indicating the MIMO scheme and/or the transmission layer number and the information indicating the multiple access scheme are mapped in one-to-one correspondence may be additionally defined and used.

4) Fourth Method

Unlike the first method, the second method and the third method, an uplink multiple access scheme may be explicitly defined and indicated in another field when the payload for the conventional uplink grant channel is designed.

5) Fifth Method

If some of the MCS indexes within a Modulation and Coding Scheme (MCS) set indicated for uplink grant and uplink transmission or some information bits of an MCS field indicate a specific uplink multiple access scheme such that the index is indicated upon uplink grant, the index may implicitly indicate the specific multiple access scheme.

6) Sixth Method

When a DCI format for an additional uplink grant channel is specified with respect to uplink transmission of the LTE-A UE which supports uplink MIMO transmission, in the case where a specific MIMO scheme and an uplink multiple access scheme available in transmission layer number (rank) is specified, the uplink multiple access scheme to which the DCI format is applied may be implicitly indicated by applying the uplink DCI format for the MIMO scheme and/or the transmission layer number (rank).

7) Seventh Method

In a process of performing association at a UE within an eNB region, a multiple access scheme desired by the UE may be sent to an eNB through RRC signaling or higher-layer signaling or may be included in an association message transmitted to the eNB. In addition, when the UE transmits scheduling request information, 1-bit or 2-bit information indicating the multiple access scheme desired by the UE is added to the existing 1-bit information, 2-bit or 3-bit scheduling request information may be converted into one modulation symbol using a phase modulation scheme, the modulation symbol may be mapped to a scheduling request channel, and the scheduling request information may be transmitted. The eNB which receives the scheduling request information may indicate an uplink multiple access scheme to the UE using any one of the first to sixth methods.

In order to support both the case of semi-statically switching the multiple access scheme and the case of dynamically switching the multiple access scheme in the system, 1-bit multiple access scheme information may be transmitted through an uplink grant channel as L1/L2 signaling regardless of semi-static switching or dynamic switching. In addition, regardless of the semi-static switching and dynamic switching, 1-bit multiple access scheme information may be defined as an L1 parameter and transmitted through RRC signaling, the information may be transmitted through an uplink grant channel as L1/L2 signaling using an implicit method (e.g., a method of scrambling a UE ID using CRS masking), or a field may be defined and explicitly transmitted. Accordingly, in some cases, the above method is applicable such that the eNB performs overriding.

If an uplink single antenna scheme and/or a multiple antenna transmit diversity scheme and/or a SU-MIMO scheme are differently defined on a per multiple access scheme basis in the system, 1 bit indicating the uplink multiple antenna transmit diversity scheme and/or the SU-MIMO scheme is not signaled separately from the 1-bit multiple access scheme information, but the 1-bit multiple access scheme information is one-to-one mapped so as to indicate the uplink multiple antenna transmit diversity scheme and/or the SU-MIMO scheme of the multiple access scheme, thereby reducing signaling overhead.

If a UE which supports a plurality of multiple access schemes performs handover, the UE performs uplink transmission to a target eNB using an SC-FDMA scheme as a multiple access scheme, regardless of the multiple access scheme used by a serving eNB. If the target eNB supports heterogeneous multiple access schemes in addition to the SC-FDMA scheme, the target eNB may set the multiple access scheme according to circumstance based on the measurement information of the UE after handover.

Upon handover, a serving eNB may query the target eNB as to the multiple access scheme based on the measurement information of the UE and adds uplink multiple access scheme information (e.g., 1 bit) of the target eNB to a handover command message transmitted to the UE based on a response signal from the target eNB or regardless of the scheme so as to indicate the uplink multiple access scheme to the UE.

All the aspects of the present invention are applicable to an LTE-A system or other mobile communication system based on an OFDM scheme in uplink.

All aspects of the present invention are applicable to direct transmission from a UE to an eNB, transmission from a UE to a relay node, between relay nodes, and from a relay node to an eNB in a state in which relay transmission is implemented, and control signaling.

Figure 16:
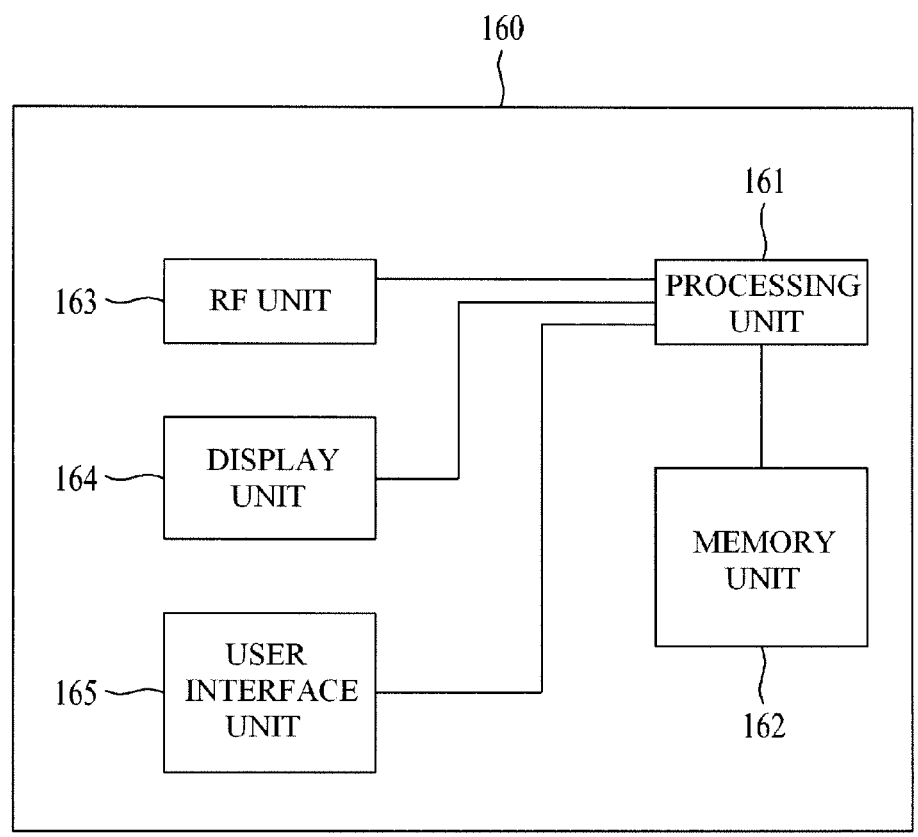
FIG. 16 is a block diagram showing the configuration of a device which is applicable to a UE and a BS and can perform the present invention.

FIG. 16 is a block diagram showing the configuration of a device that can perform the present invention and which is applicable to a user equipment (UE) and a base station (BS). As shown in FIG. 16, the device 160 includes a processing unit 161, a memory unit 162, a Radio Frequency (RF) unit 163, a display unit 164 and a user interface unit 165. A physical interface protocol layer is performed by the processing unit 161. The processing unit 161 provides a control plane and a user plane. The function of each layer may be performed by the processing unit 161. The memory unit 162 may be electrically connected to the processing unit 161 and stores an operating system, application programs and general files. If the device 160 is a user equipment, the display unit 164 may display a variety of information and may be implemented using a Liquid Crystal Display (LCD) or an Organic Light Emitting Diode (OLED). The user interface unit 165 may be combined with a known user interface such as a keypad or a touch screen. The RF unit 163 may be electrically connected to the processing unit 161 so as to transmit or receive an RF signal.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station" may also be replaced with the terms user equipment (UE), mobile station (MS) or mobile subscriber station (MSS) as necessary.

The following embodiments of the present invention can be implemented by a variety of means, for example, hardware, firmware, software, or a combination thereof.

In the case of implementing the present invention by hardware, the present invention can be implemented using application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit is located inside or outside of the processor, so that it can communicate with the aforementioned processor via a variety of well-known parts.

The aforementioned embodiments are achieved by combination of structural elements and features of the present invention in a predetermined manner. Each of the structural elements or features should be considered selective unless specified otherwise. Each of the structural elements or features may be implemented without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Moreover, it will be apparent that some claims referring to specific claims may be combined with other claims referring to the other claims other than the specific claims to constitute the embodiment or add new claims by amendment after the application is filed.

The present invention is applicable to a user equipment, a base station or other device of a radio mobile communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of generating an uplink reference signal by a user equipment (UE) in a system supporting a plurality of uplink access schemes, the method comprising:

transmitting information on a preferred uplink access scheme to a base station;

receiving, from the base station, reference signal configuration information indicating a configuration of a reference signal to be transmitted to the base station, wherein the reference signal configuration information is generated for each of the plurality of uplink access schemes; and transmitting a subframe including the reference signal generated based on the reference signal configuration information to the base station, wherein the reference signal configuration information includes at least one cyclic shift value of a sequence of the reference signal, wherein the plurality of uplink access schemes consist of an essential uplink access scheme and one of selectable uplink access schemes, wherein symbols of the reference signal in the subframe are varied according to the plurality of uplink access schemes, wherein the selectable uplink access schemes include a scheme for transmitting an uplink signal using clustered Single Carrier-Frequency Division Multiple Access (SC-FDMA) and a scheme for transmitting an uplink signal using segmented SC-FDMA, wherein the reference signal configuration information for the selectable uplink access schemes includes a plurality of different cyclic shift values of the sequence of the reference signal corresponding to a plurality of non-contiguous resource blocks, wherein the reference signal configuration information is received through an uplink grant channel, wherein the uplink grant includes information indicating one of the plurality of selectable uplink access schemes, and wherein the one selectable uplink access scheme is determined based on the information on the preferred uplink access scheme.

2. The method according to claim 1, wherein, if a plurality of Resource Blocks (RBs) is non-contiguously allocated to the user equipment in a frequency domain, the reference signal configuration information includes information about different cyclic shift values for each of the plurality of RBs.

3. The method according to claim 2, wherein the reference signal is a Sounding Reference Signal (SRS) or a Demodulation-Reference signal (DM-RS).

4. The method according to claim 1, wherein the essential uplink access scheme includes a scheme for transmitting an uplink signal using Single Carrier-Frequency Division Multiple Access (SC-FDMA).

5. The method according to claim 4, wherein the scheme for transmitting the uplink signal using the clustered SC-FDMA includes a subcarrier mapping process between a Discrete Fourier Transform (DFT) process and an Inverse Fast Fourier Transform (IFFT) process, and wherein, in the subcarrier mapping process, DFT process output samples are grouped into a predetermined number of sub-groups and are mapped to separate subcarrier regions in frequency domain on a per sub-group basis.

6. The method according to claim 1, wherein the scheme for transmitting the uplink signal using the segmented SC-FDMA groups modulation symbols of an entire time domain into a predetermined number of groups and performs a DFT process on a group unit basis, and the predetermined number is greater than 1.

* * * * *